United States Patent [19]

Bishop

[11] Patent Number: 4,600,961
[45] Date of Patent: Jul. 15, 1986

[54] PROTECTIVE RELAY APPARATUS FOR DETECTING HIGH-IMPEDANCE GROUND FAULTS

[75] Inventor: Martin T. Bishop, Wilkins, Pa.

[73] Assignee: Westinghouse Electric Corp., Pittsburgh, Pa.

[21] Appl. No.: 528,354

[22] Filed: Sep. 1, 1983

[51] Int. Cl.[4] ............................................. H02H 3/26
[52] U.S. Cl. ..................................................... 361/76
[58] Field of Search ............................... 361/76, 77, 42

[56] References Cited

U.S. PATENT DOCUMENTS

| | | | |
|---|---|---|---|
| 1,963,195 | 6/1934 | Friedländer et al. | 361/76 X |
| 2,000,767 | 5/1935 | Lewis | 361/76 X |
| 3,172,012 | 3/1965 | Gafford | 361/76 |
| 3,225,256 | 12/1965 | Carter et al. | 361/76 X |
| 3,745,375 | 7/1973 | Huruse | 361/76 X |
| 3,992,651 | 11/1976 | Hodges | 361/76 |
| 4,024,439 | 5/1977 | McClain et al. | 361/76 |
| 4,146,913 | 3/1979 | Sun | 361/76 |
| 4,297,740 | 10/1981 | Hagberg | 361/67 |
| 4,347,542 | 8/1982 | Calhoun | 361/76 |
| 4,357,644 | 11/1982 | Schmidt | 361/76 |
| 4,363,066 | 12/1982 | Bishop | 361/85 |

Primary Examiner—G. P. Tolin
Assistant Examiner—Jonathan Wysocki
Attorney, Agent, or Firm—W. E. Zitelli

[57] ABSTRACT

A protective relay for detecting high-impedance ground faults on a three-wire distribution system. The protective relay operates independently of the current in the ground path by using the positive and negative sequence currents to detect a fallen conductor. The ratio of the negative sequence to positive sequence current is calculated and when this ratio exceeds a predetermined value, a trip signal is produced.

4 Claims, 1 Drawing Figure

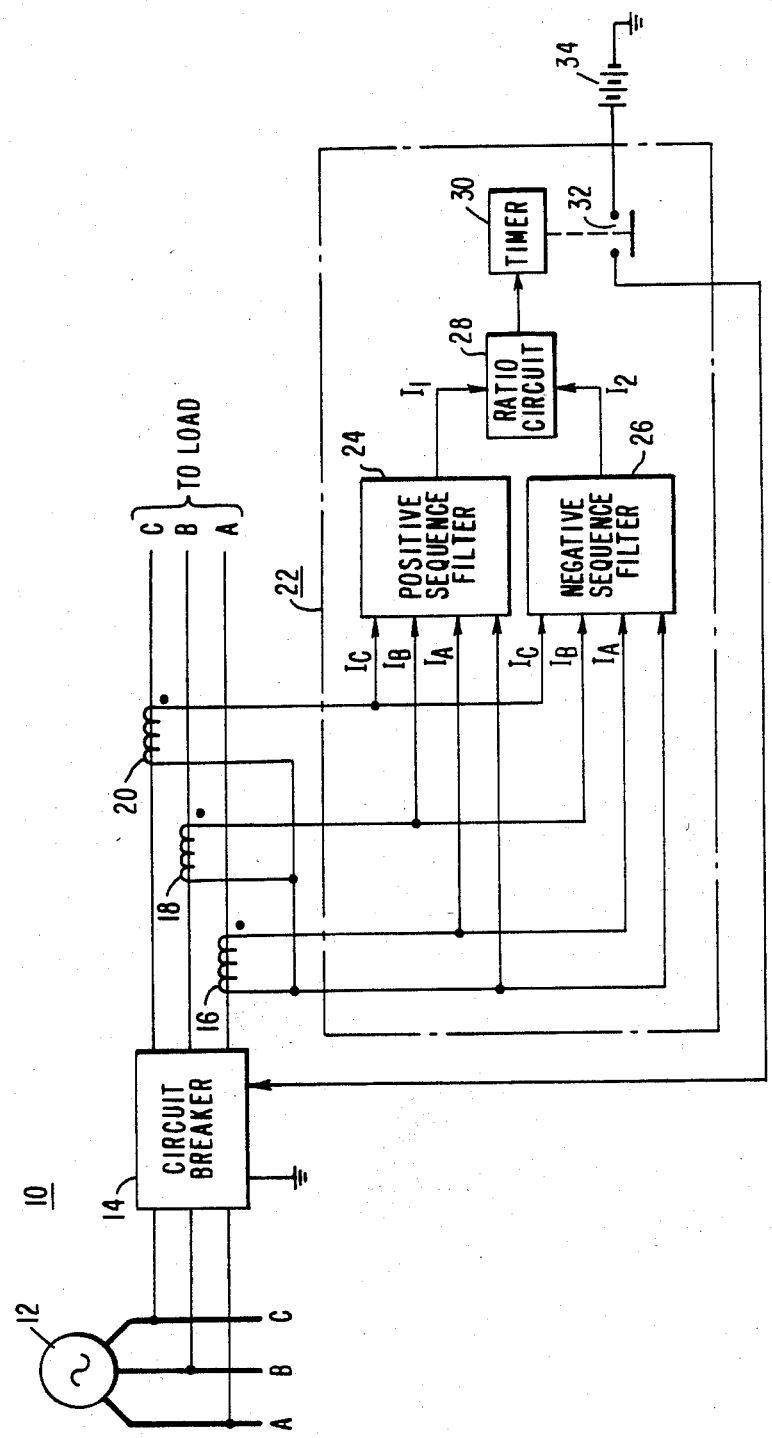

PROTECTIVE RELAY APPARATUS FOR DETECTING HIGH-IMPEDANCE GROUND FAULTS

BACKGROUND OF THE INVENTION

1. Field of the Invention

This invention relates generally to an apparatus for detecting high-impedance ground faults, and more specifically, to such an apparatus for detecting high-impedance ground faults on a three wire electrical distribution system.

2. Description of the Prior Art

Electrical transmission lines and power generating equipment must be protected against insulation faults and consequent short circuits that can cause collapse of the power system and serious and expensive apparatus damage. For instance, such a fault condition is caused by lightning-induced flashover from a transmission line to ground or between adjacent transmission line conductors. Under such a fault condition, line currents can increase to several times the normal value, thereby causing loss of synchronism among generators and damaging or destroying both the transmission line and the attached equipment. To avoid equipment damage and collapse of the entire power system, faulted apparatus on the main transmission line are isolated from the network by circuit breakers actuated by protective relays. The protective relays continuously monitor ac voltages and currents to locate line faults and initiate line isolation via tripping of the appropriate circuit breakers. These faults are located by examining the relationship of the ac voltages and currents.

Many electric utility distribution systems use three-phase four-wire circuits to supply both three-phase and single-phase loads. These circuits are protected against faults by three-phase circuit breakers at the substation, generally equipped with phase-overcurrent and ground-overcurrent relays. Ground-overcurrent relay trip settings must allow for normal circuit load unbalances, coordinate with other protection devices, and prevent tripping on large in-rush currents during cold-load pick-up and normal circuit switching. In some distribution circuits, the unbalanced loads could require a ground relay trip setting as high as one-half the phase relay setting. In other distribution circuits, the ground relay may be omitted entirely because of severe unbalanced conditions that make it no more effective than the phase relays. As a result, high-impedance single-phase-to-ground faults, characterized by low-fault current magnitudes, are not generally detectable by overcurrent protective devices commonly used on distribution circuits because such faults do not produce sufficient current or circuit unbalance to operate the phase-overcurrent or ground-overcurrent protective relays. Such high-impedance faults may result from the breaking of a conductor that hangs free or contacts a high-impedance surface such as a tree, antenna, or asphalt. These faults, although not so destructive to the distribution system, may cause extended service interruption.

The following U.S. patents, all assigned to the assignee of the present invention, disclose novel apparatus for detecting high-impedance ground faults on four-wire electrical power distribution systems: U.S. Pat. Nos. 4,297,740; 4,347,542; 4,357,644; and 4,363,066. The apparatus of U.S. Pat. No. 4,297,740 evaluates the zero sequence current on the distribution system to detect a high-impedance fault. The amount of zero sequence current necessary to trip the protective relay is determined by the phase currents or the positive sequence current. U.S. Pat. No. 4,357,644 discloses an electromechanical apparatus to detect high-impedance faults. The operating quantity for this electromechanical apparatus is the zero sequence current. The restraint quantity is developed using a function of any one of the following signals: any two-phase currents, the positive sequence current minus the zero sequence current, the sum of the three-phase currents, or the positive sequence current. U.S. Pat. No. 4,347,542 discloses an improvement to U.S. Pat. No. 4,357,644 to improve the equality of relay response for a given type of fault for all phase combinations. This improved response is accomplished by modifying the winding arrangement on the magnetic core of the relay. The improved embodiment utilizes the same quantities to form the operating and restraining signals. In U.S. Pat. No. 4,363,066, the operating quantity is a function of the zero sequence current and the restraining quantity is a function of the pre-fault phase current less the zero sequence current. As noted, each of these protective relays are suitable for detecting high-impedance ground faults only on four-wire distribution systems.

For three-wire distribution systems, ground fault relaying is currently accomplished through a single ground source at the substation. For a wye-connected substation transformer, the center of the wye (on the distribution voltage side) is connected to ground either solidly or through an impedance. When a ground fault occurs, a zero sequence current flows through the solidly connected ground wire. In an impedance-grounded system, a zero sequence voltage is developed across the impedance. The zero sequence current or zero sequence voltage is sensed to detect a ground fault. Due to the high zero sequence impedance and the resulting low magnitude of fault current in a three-wire system, it is difficult to detect such a zero sequence current or zero sequence voltage.

If the substation transformer is delta connected, the distribution side is grounded through a zigzag or grounded wye open delta grounding transformer arrangement to detect zero sequence voltage. Here also, the zero sequence voltage for a ground fault is small due to the high zero sequence impedance of the earth ground path. Either of these prior art grounding schemes provides a voltage or current signal when a ground fault occurs on the three-wire system. Although set very sensitively, neither of the schemes can reliably detect high-impedance ground faults, which occur when a phase conductor breaks and contacts the earth or another high-impedance object.

SUMMARY OF THE INVENTION

The present invention is a new and improved protective relay for three-wire distribution systems, which provides more sensitive ground fault protection to detect and isolate high-impedance faults due to fallen and broken conductors. The novel apparatus disclosed herein determines the positive sequence current and the negative sequence current flowing on the distribution system. The ratio of these two currents is then calculated, and if this ratio exceeds a predetermined value a contact closure occurs. A fault alarm might be activated or a circuit breaker associated with the distribution system might be opened when the contact closure occurs.

BRIEF DESCRIPTION OF THE DRAWING

The invention may be better understood, and further advantages and uses thereof more readily apparent, when considered in view of the following detailed description of exemplary embodiments, taken with the accompanying FIGURE illustrating a three-phase distribution system including a protective relay constructed according to the teachings of the present invention.

DESCRIPTION OF THE PREFERRED EMBODIMENTS

Turning to the FIGURE, there is shown a three-phase three-wire electrical power distribution system 10 including a protective relay 22 constructed according to the teachings of the present invention. The three-phase three-wire electrical power distribution system 10 includes an ac source 12 for producing an ac electrical power signal having a frequency of 50 Hz or 60 Hz. The ac source 12 is connected to a phase A conductor, a phase B conductor, and a phase C conductor via a circuit breaker 14. A current transformer 16 mounted in proximity to the phase A conductor provides a signal $I_A$ that is representative of the current on the phase A conductor. A current transformer 18 mounted in proximity to the phase B conductor produces a signal $I_B$ that is representative of the current on the phase B conductor. Lastly, a current transformer 20 mounted in proximity to the phase C conductor produces a signal $I_C$ that is representative of the current on the phase C conductor.

A positive sequence filter 24 is responsive to the signals $I_A$, $I_B$, and $I_C$ for producing a signal $I_1$ representative of the positive sequence current on the three-phase three-wire electrical power distribution system 10. A negative sequence filter 26 is also responsive to the signals $I_A$, $I_B$, and $I_C$ for producing a signal $I_2$ representative of the negative sequence current on the three-phase three-wire electrical power distribution system 10. The positive sequence filter 24 and the negative sequence filter 26 can be constructed in accordance with any of the well-known means for producing the positive or negative sequence current from the phase currents. A ratio circuit 28 is responsive to the positive sequence current $I_1$ and the negative sequence current $I_2$.

The ratio circuit 28 determines the ratio of the negative sequence current to the positive sequence current (i.e., $I_2/I_1$) to detect the fallen conductor on the three-phase three-wire electrical power distribution system 10. Because the protective relay 22 uses the positive and negative sequence currents to detect fallen conductors, it operates independently of any current in the ground path of a three-wire distribution system. Experimentation has shown that the ratio of the negative sequence current to the positive sequence current ($I_2/I_1$) in the normal case of an exemplary three-wire distribution system is approximately 0.10. For a fallen phase conductor in proximity to a substation, the ratio increases to 0.96. Fallen-conductor open-phase faults farther from the substation produce a smaller ratio since less load current is interrupted. Although not shown in the FIGURE, the ratio circuit 28 allows for variation in the setting of $I_2/I_1$ thus allowing use of the protective relay 22 on three-wire electrical power distribution systems having various typical ratios of negative sequence to positive sequence current. Use of this ratio characteristic allows the protective relay 22 to operate independently of the load level because the normal unbalance of the positive and negative sequence currents is nearly independent of load.

When the ratio circuit 28 determines that the ratio of negative sequence to positive sequence current has exceeded the set value, which may be 0.2, for example a signal is sent to a timer 30. After a predetermined pickup time, the timer 30 closes normally-open contacts 32. When closed, the normally-open contacts 32 connect a station battery 34 to the circuit breaker 14 for opening thereof. The timer 30 is necessary to coordinate response of the protective relay 22 with other protective devices (not shown in the FIGURE) on the three-phase three-wire electrical power distribution system 10.

Although discussed in association with three-wire distribution systems, the protective relay 22 can also be used on four-wire distribution systems. In this application the positive-to-negative sequence current ratio is determined and the circuit breaker trips when a predetermined ratio is exceeded.

What is claimed is:

1. A protective relay for detecting high impedance broken conductor faults on a three-phase electrical power distribution system with phase A, B, and C conductors, said protective relay comprising:
   first means for providing a first signal representative of the positive sequence current flowing in the electrical power distribution system;
   second means for providing a second signal representative of the negative sequence current flowing in the electrical power distribution system; and
   third means responsive to said first and second signals for calculating the ratio of the negative sequence current to the positive sequence current and for indicating the occurrence of a high-impedance fault when the ratio exceeds a predetermined value.

2. The protective relay of claim 1 wherein the first means includes:
   a first current transformer means for producing a signal representative of the current flowing on the phase A conductor of the electrical power distribution system;
   second current transformer means for producing a signal representative of the current flowing on the phase B conductor of the electrical power distribution system;
   third current transformer means for producing a signal representative of the current flowing on the phase C conductor of the electrical power distribution system;
   positive sequence filter means responsive to the currents flowing on the phase A, B, and C conductors for producing the first signal.

3. The protective relay of claim 1 wherein the second means includes:
   first current transformer means for producing a signal representative of the current flowing on the phase A conductor of the electrical power distribution system;
   second current transformer means for producing a signal representative of the current flowing on the phase B conductor of the electrical power distribution system;
   third current transformer means for producing a signal representative of the current flowing on the phase C conductor of the electrical power distribution system;
   negative sequence filter means responsive to the currents flowing on the phase A, B, and C conductors for producing the second signal.

4. The protective relay apparatus of claim 1 wherein the predetermined value of the ratio is 0.2.

* * * * *